United States Patent [19]

Axer et al.

[11] 4,063,858

[45] Dec. 20, 1977

[54] LAYER-FORMING APPARATUS, ESPECIALLY FOR THE PREPARATION OF PARTICLE-BOARD MATS

[75] Inventors: Heinrich Axer, Nettetal; Wolfgang Michels, Krefeld; Werner Ufermann, Penzberg, all of Germany

[73] Assignee: G. Siempelkamp & Co., Krefeld, Germany

[21] Appl. No.: 711,882

[22] Filed: Aug. 5, 1976

[30] Foreign Application Priority Data

Aug. 8, 1975 Germany ............................ 2535382

[51] Int. Cl.[2] ............................................... B29J 5/00

[52] U.S. Cl. ........................................ 425/81; 425/83; 425/224; 264/113

[58] Field of Search .................................... 425/81-83, 425/223, 224, 148; 264/112, 113

[56] References Cited

U.S. PATENT DOCUMENTS

| | | | |
|---|---|---|---|
| 2,737,997 | 3/1956 | Himmelheber et al. | 425/81 X |
| 2,979,105 | 4/1961 | Burkner | 425/81 X |
| 3,028,287 | 4/1962 | Greten | 425/81 X |
| 3,098,781 | 7/1963 | Greten | 264/113 X |
| 3,115,431 | 12/1963 | Stokes et al. | 264/113 |
| 3,743,461 | 7/1973 | Williams | 425/148 |
| 3,864,066 | 2/1975 | Gerhardt | 425/224 X |

*Primary Examiner*—Robert L. Spicer, Jr.
*Attorney, Agent, or Firm*—Karl F. Ross

[57] ABSTRACT

A layer-forming apparatus, particularly for the preparation of particle-board mats adapted to be compressed with heating in a platen or other press to form a coherent structure generally known as particle board, comprises a dispensing unit for metering the particulate matter onto a conveyor to form the layer and, between the dispensing unit and the conveyor, a classifying device for separating fine particles from coarser particles. The conveyor feeds a head which spreads the particles from the layer on a receiving surface. The receiving surface carries the mat and the head is designed to deposit the coarser particles of the layer from the conveyor either before or after the fine particles so that the fine particles form a facing zone on the bottom and/or top of the mat.

6 Claims, 5 Drawing Figures

LAYER-FORMING APPARATUS, ESPECIALLY FOR THE PREPARATION OF PARTICLE-BOARD MATS

FIELD OF THE INVENTION

The present invention relates to an apparatus for producing a mat on a receiving surface and, more particularly, to a layer-forming apparatus capable of producing particle-board mats.

BACKGROUND OF THE INVENTION

In the production of particle board, this term being used generically for fiberboard, chipboard, sawdust board and boards made from mixtures of cellulosic fibers and chips, it is a common practice to form a mat of the particulate material upon a receiving surface, the mat consisting of the particles to be bonded together by intrinsic binding agents or a mixture of the particles with a binder. Intrinsic binding agents may be the abietic resins normally present in wood particles while the additional synthetic-resin binding agents can be of the thermally hardenable or thermosetting type. Suitable binders for this purpose are the phenol-formaldehyde, urea, resorcinol or melamine resins.

The mat, of a particular thickness to provide the necessary quantity of material per unit of surface area, is compacted, generally with heating, in a platen or other press to activate the resin and cause it to bond the particles together into a coherent structure. Depending upon the amount of binder present, the degree and intensity of compression and the nature of the heating cycle, such particle boards can be of extremely low porosity and high density for use as structure materials, can be of moderate porosity and strength for use as a facing material, or can be of high-porosity and relatively low strength for thermal and acoustical insulation purposes.

It is known to form such mats by dispensing the particulate matter upon the receiving surface, the latter preferably being a conveyor or the like which is displaced past a dispensing head.

In general, however, the formation of the mat is not so simple. Firstly, it is necessary to have complete control of the amount of the particulate material which is deposited per unit area of the receiving surface so that the particle board, upon compression of the mat, will have the desired density and uniformity. Secondly, it is important to dispense the particulate material in such spread, distributed or nonagglomerated form as to also insure uniformity in the product. Thirdly, the system must be capable of depositing materials of different particle sizes and character, e.g. fibers, chips and dust, depending upon the nature of the product which is desired.

Thus the art of forming the mat or layer of particulate matter upon a receiving surface has become quite sophisticated.

It is known, for example, to provide a layer-forming apparatus for depositing particulate matter as particle-board mats upon a receiving surface, especially for the production of particle board by hot-pressing, with the following main components:

a. A particulate-material hopper with a conveyor-belt floor, a device for feeding particulate matter into the hopper, and a discharge roller grate forming an end wall of the hopper on the side toward which the particulate material is moved by the conveyor, the roller grate being inclined downwardly in the direction of feed of the particulate material. The particulate material is thereby predominantly dispensed through the roller grate and from the leading end of the conveyor floor. This arrangement has the advantage that the dispensing process permits the product to cascade downwardly through the interstices of the roller grate with a minimum of compaction and agglomeration and with a certain dispersal of the particles.

b. A metering device with a metering conveyor disposed below the hopper and provided with means for controlling the quantity of particulate material which is carried by the metering conveyor. The latter means can include a volume-metering roller, a weight-metering roller or a combination of the two, the latter regulating the rate of which the particulate matter is advanced toward the receiving surface. At the discharge end of the metering conveyor, a cast-off roller can be provided to propel the particulate matter from the conveyor.

c. A spreading head receiving the particulate matter from the cast-off roller and spreading it upon the receiving surface. The latter can be disposed beneath the spreading head and can be used to carry the mat or final layer to the press.

Such an apparatus is described, for example, in German Offenlegungsschrift DT OS No. 22 23 779. It has been found to be extremely effective in the preparation of mats for particle board.

Frequently, in the fabrication of particle board, it is desirable to have a uniform surface zone on one or both of the faces thereof. It is known, for example, to apply facing laminates to a particle-board core to achieve esthetic results or to separately apply a laminate of low permeability to prevent moisture penetration or the like. Such steps are labor-consuming and expensive and are not always effective. It thus has long been sought to be able to provide a surface zone of fine particles on one or both faces of a particle board using otherwise conventional mat-forming apparatus and hence at minimum cost and with a maximum effectiveness.

OBJECT OF THE INVENTION

It is thus the object of the present invention to provide an improved apparatus for the formation of particle-board mats which is more effective than the preexisting system described above and which solves the problem set forth.

SUMMARY OF THE INVENTION

This object and others which will become apparent hereinafter are attained, in accordance with the invention, by providing, in a device consisting of the combination (a)–(c) above, with a layer-receiving substrate, of means between the hopper and the substrate for separating finely divided particles from the particulate matter and ultimately depositing these particles as a discrete zone or thickness upon the layer-receiving surface. This discrete zone or thickness may be applied to the layer-receiving surface before the balance of the particulate matter is deposited, whereby the fine particles form a bottom zone. Alternatively, the fine particles can be deposited upon the previously formed layer of the remaining particulate matter so that the fine particles form the upper zone of the mat.

According to another feature of the invention, the apparatus comprises between the discharge roller grate and the metering conveyor, of a classifying device capable of separating the fine particles from the remainder of the particles of the particulate material, the fine particles being deposited upon the metering conveyor in a discrete zone. Advantageously, this discrete zone is preferentially deposited by the spreading head upon the layer-receiving surface either before or after the remainder of the particulate matter is spread thereon.

This can be ensured if, in accordance with another feature of the invention, the spreading head is an interdigitated disk spreader which comprises a multiplicity of the disk rollers, the disks of each roller interdigitating between the disks of an adjacent roller. A disk roller can be a multiplicity of axially spaced annular disk-shaped members mounted for rotation on a common shaft or driven about a common axis, two such shafts being spaced apart by a distance less than the disk diameter and having the disk members of the two shafts axially staggered so that each disk reaches into the space between a pair of disks of the adjoining shaft. A plurality of such shafts, advantageously in coplanar relationship, may be provided parallel to but above the horizontal receiving surface.

According to still another important feature of the invention, between the spreading head and the layer-receiving or mat-forming surface, there can be provided an air classifier which preferentially causes the deposition of the fine particles upon the surface or upon previously deposited material.

With a system embodying the present invention, therefore, the classifying device separates a facing material layer from the balance of the particulate matter and applies it as the first layer to the metering conveyor whereas the spreading head and the air classifier can separate a cover layer from the particulate material and apply it as the last layer of the material to be deposited. Thus facing particles are applied in a first zone along the underside of the mat and as the last zone on the top thereof. When the mat is pressed to form the particle board, the surface zones thereof, although bonded homogeneously to the balance of the particle board, have a particularly uniform, esthetic and closed-pore configuration.

The principles of the present invention can be carried out in various ways. For example, it has been found to be simple and effective to provide an embodiment in which the classifying device consists of at least one classifying roller or drum dispersing the particles by size directly below the conveyor bottom of the hopper and the bottom of the roller grate. Such a drum operates by utilizing the variation of the momentum of the particles with size. The drum, which is rotatably driven, is engaged by the cascading particles and may have a roughened, contoured, pocketed or like surface to ensure entrainment of the particulate matter. Particulate matter of larger particle size receives a greater momentum from the drum and is cast further therefrom than smaller particles so that the smaller particles can be deposited in a discrete layer upon the surface of the metering conveyor proximal to this drum. Larger particles are cast further therefrom and can be deposited in a layer upon the initially deposited fine-particle layer.

Alternatively or, in addition, a classifying screen or sieve can be provided to intercept the particles cascading from the roller grate so that the smaller particles destined to constitute the fine particle layer pass through this screen or sieve while the larger particles are guided onto this initially formed fine particle layer.

The use of a variable-speed rotary classifying drum alone or in combination with the sieve or the use of a sieve with variable mesh size or a replaceable sieve allows the system to be adjusted to select the particle size range for the facing layer at will.

An increase in the amount of the fine particle fraction adapted to form the facing layer and an effective homogeneous deposition of this layer are achieved when, in accordance with the invention, the spreading head is of the interdigitating multiple disk type. When the disks of the disk rollers are all driven in the same sense and the particulate matter is deposited along the upper surface of the array of interdigitated disk rollers, especially when the intersticial spacing between the disks increases progressively in the direction of entrainment of the particulate matter, a highly effective distribution of the particles is ensured with a predominance of the fine component being deposited initially. The spreading head at its upstream end thus constitutes a finer spreader while an intermediate portion of the head forms a spreader for particles of intermediate size and the last portion of the disk-roller array forms a coarse-particle spreader.

The air classifier of sifter, according to the invention, can comprise at least one separating sieve advantageously located beneath the classifying drum below the spreading head. However, all of the disks, if provided with projections or other formations of the head, can likewise function as air sifters to carry residual fine particles to the downstream end of the head and thereby deposit these particles as a facing layer on top of the coarse material layer.

The system has the advantage that it allows a highly uniform spreading of the particulate matter in a plurality of layers with concentration of the fine particles in the facing layers of the mat. The system is extremely simple to operate and indeed, whether a particular facing layer is the bottom layer or the top layer will depend only upon the direction of displacement of the layer-receiving surface beneath the head. Of course, a pair of such apparatuses can be provided in tandem so that the same particle size fraction which is disposed on the mat-forming surface can be applied to that mat produced by the other machine or apparatus of the facing layer.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
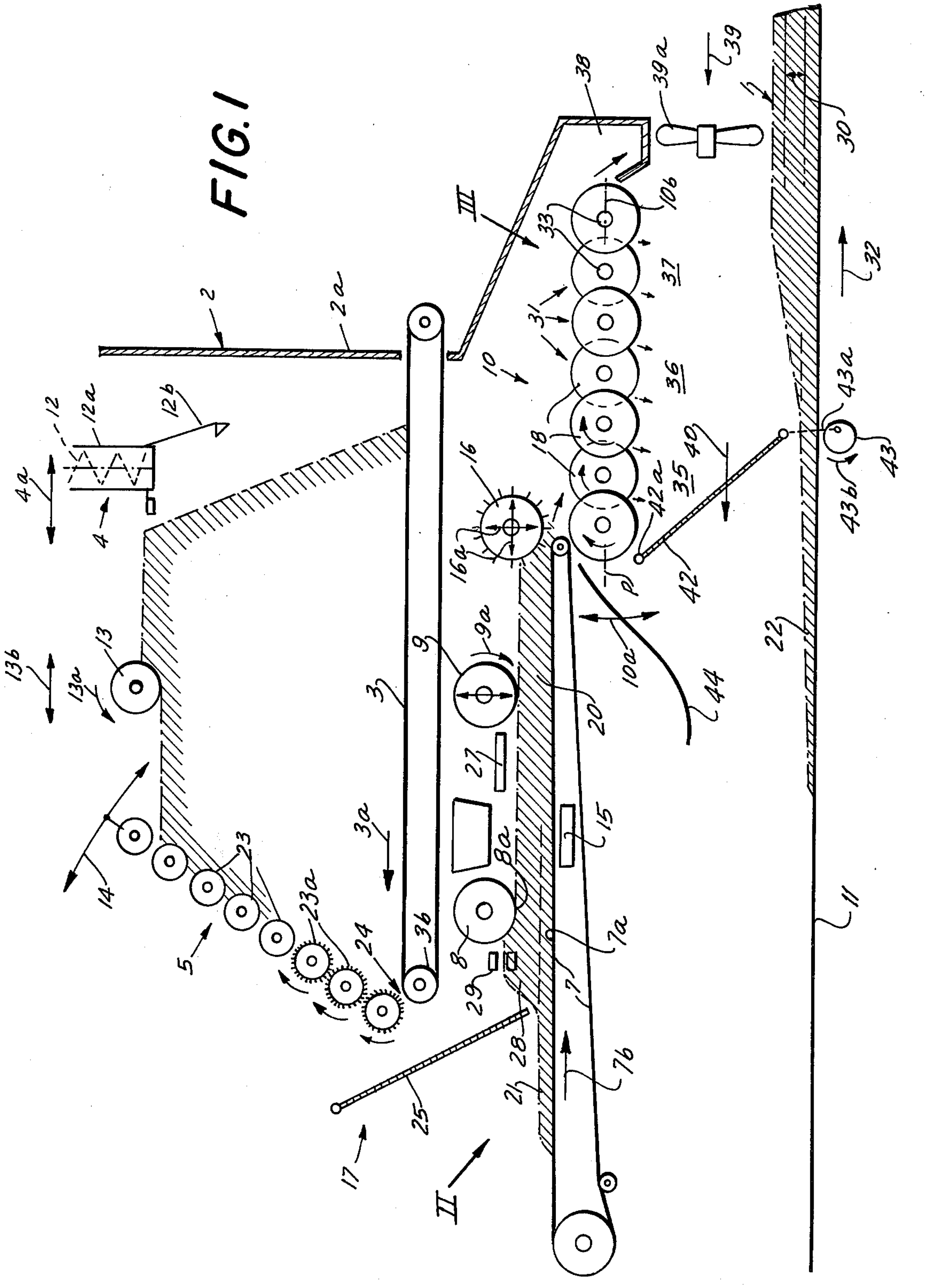
FIG. 1 is a diagrammatic vertical section through an apparatus embodying the invention.

The structure shown in the drawing is, of course, diagrammatic to the extent that it represents known elements and devices. Reference may be had in this regard to the German Offenlegungsschrift mentioned previously.

In the drawing we have shown an apparatus for forming a mat 1 upon a layer-receiving surface 11 for subsequant subdivision into lengths and compression in a platen press with the application of heat to form pressed board.

Figure 2:
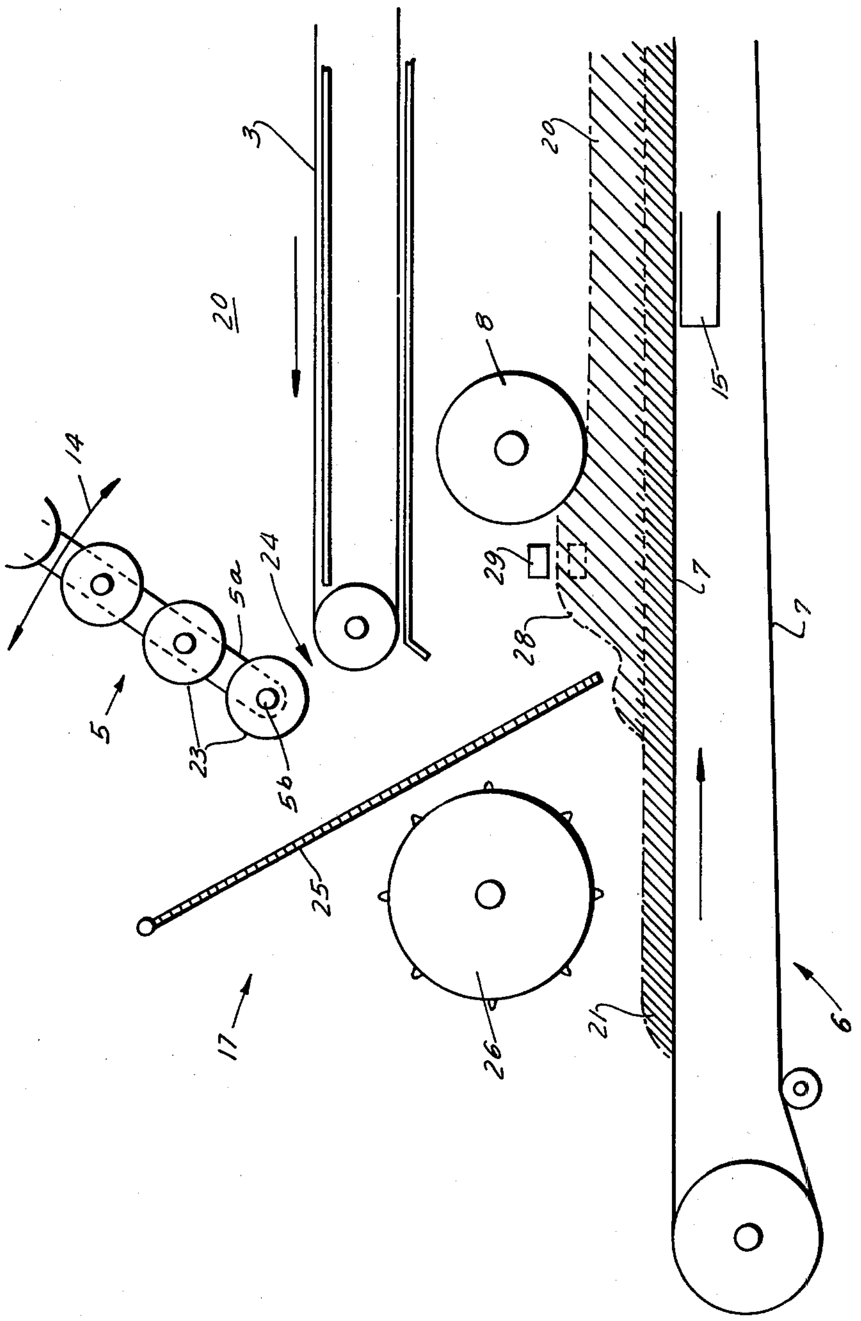
FIG. 2 is an enlarged detail view of the region represented at II of FIG. 1.

The apparatus comprises a hopper generally designated 2, having a support structure or wall 2a and a floor 3 formed by a conveyor driven in the direction of arrow 3a and having a discharge end 3b. A side wall of the hopper is formed by a roller grate 5 which can, as illustrated in FIG. 2, comprise a plurality of rollers 23 journaled on a common support 5a which is swingable about the axis 5b as represented by the double-headed arrow 14.

This hopper deposits the particulate matter upon a metering device represented at 6 and comprising a metering conveyor 7 having a volume metering roller 8, a weight-metering roller 9 and a cast-off drum 16.

The particulate material is thereby delivered to the spreading head generally represented at 10 and cascades onto the mat-forming conveyor 11 as will be described in greater detail below.

The hopper 2 is provided with a periodically driven worm 12 rotatable in a duct 12a under the control of a sensor 12b which monitors the pile 20 of the particulate matter upon the surface of the conveyor floor 3 of the hopper.

The pile within the hopper is leveled by a smoothing roller 13 which can be driven in the direction of arrow 13a so as to sweep back excessively high material. As has been noted earlier, the roller grate 5 has its inclination to the vertical adjustable as represented by the arrow 14.

The volume metering roller 8 controls the quantity (volume) of the particulate matter that can pass between its surface 8a and the face 7a of the conveyor 7. This roller may be raised or lowered by a conventional servomechanism (not shown) operated by the signal output of a flat-weight measuring device 15 which can respond capacitively to the weight per unit area of the comminuted material displaced along the conveyor 7. The output of this device can also control a vertically shiftable weight-regulating roller 9 which is driven in the direction of arrow 9a and can also be vertically adjusted to ensure a proper weight per unit area of the particulate matter forming the layer 20 on the conveyor 7.

The cast-off drum 16 is adjustable with respect to its speed, height and position as represented by the arrows 16a.

In addition to these basic elements the device according to the invention comprises between the roller grate 5 and the metering conveyor 7, a classifying device 17.

The spreading head 10 comprises a plurality of interdigitating spreading disks 18 driven in the same sense (arrow 34) and provided with disks having toothed peripheries.

Between the spreading head 10 and the layer-receiving conveyor 11, there is provided an air classifier or separator 19.

As can be seen from FIG. 1, the classifying device 17 can comprise a sieve 25 positioned to deposit the particles traversing the sieve, i.e. the fines, as a layer 21 directly upon the surface 7a of the metering conveyor 7. The balance of the particle mixture 20 cascades in a mass 20 upon the layer 21 so that the latter forms a fine particle zone beneath the particle layer.

The spreading head 10 and the air classifier 19 also separate fines from the coarser particles, e.g. with the aid of a sieve 42, and deposit these fines as a facing layer 22 upon the mat-forming 11.

In operation, the particulate mixture is introduced by the filling worm 12 into the hopper 2 and advantageously the feed device 4 can be displaced back and forth as represented by the arrow 4a to distribute the mass 20 uniformly on the surface of the conveyor 3. The smoothing roller 13 at the top of the hopper can also be horizontally movable (arrow 13b) and is driven in the counterclockwise sense represented by 13a to level the top of the mass 20 in the hopper.

The particulate material 20 from the hopper cascades via the roller grate 5 and the leading end 3b of the conveyor 3 downwardly so that the fines pass through the sieve 25 while the coarse particles accumulate to the right of this sieve.

The rollers 23 of the roller grate are spiked as shown at 23a to advance the mass of particles downwardly without compacting them. The conveyor 3, therefore, serves to press the mass 20 continuously lightly in the direction of arrow 3a against the roller grate 5 to insure no interruption in the feed of the particulate material through the gap 24, so that the entire pile of particulate material 20 on the conveyer 3 has its leading side engaged by the roller grate 5, the latter, swingable in the direction of arrow 14. The greater the inclination to the vertical, the more material will be swept through the gap 24 for a given rate of variation of the conveyer 3.

Figure 5:
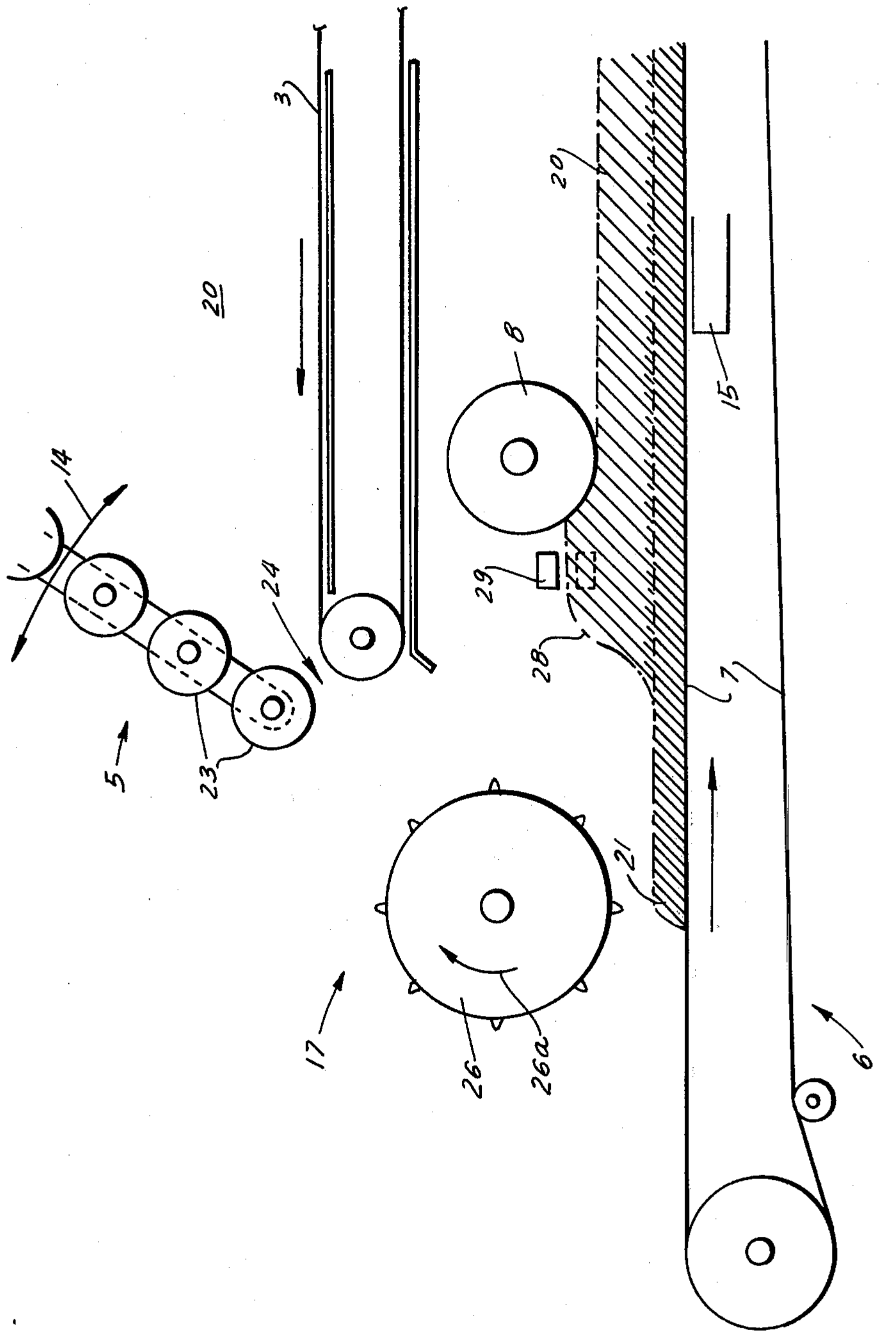
FIG. 5 is a view similar to FIG. 2 illustrating another embodiment of the invention.

Upon the discharge of particulate material from the hopper 2 an initial classification is carried out, as described to separate a layer 21 of finer particles from a balance of the particulate material. In the embodiment of FIG. 1, the initial classification is effected by a sieve 25 which can be vibrated by a device of the type shown at 43 and described below. Of course, this sieve can also be stationary. Instead of the sieve, as can be seen in FIG. 5, a casting roller 26 can be provided and can be driven in the counterclockwise sense represented by the arrow 26a. The fine particles, because of their reduced momentum tend to fall in the layer 21 below the roller 26 while the larger particles are cast further away to pile up at 28 upon the fine-particle layer. As can be seen from FIG. 2, both the drum 26 and the sieve 25 can be provided together as the first classifying state if desired. In this case, any coarser particles which pass through the sieve are thrown forwardly to overly the layer 21. In further classification, the segmentation of the particles into fine and coarse zones increases.

The sieve 25 has a mesh size such that the deposition of a continuous zone 21 is insured and a substantially uniform gradient of particle sizes from the finest of the facing zone to the coarse particles of the overlying zone is achieved.

The layer on the metering conveyer 7 is controlled by the adjustable volume-metering roller 8 and a weight-metering roller 9 downstream thereof. Between the two rollers 8 and 9, the aforementioned sensor 15 can be provided to adjust the level of the roller 9 to achieve the desired weight of particulate matter per unit area of the layer. Each excess particulate mat is provided, it can be carried away by a laterally moving conveyer 27.

Ahead of the roller 8 is a bank of the particulate material 28, the height of which can be metered by the sensor 29. The sensor 29 controls the drive motor (not shown) for rollers 23 of the roller grate 5. When the bank height increases excessively, the speed of the rollers 23 is decreased and vice versa.

The particulate mat is not deposited directly from the metering conveyer 7 on the mat-forming conveyer 11. Instead, at the discharge end of the metering conveyer 7, there is provided a castoff roller 16 which spreads the particulate mat or other spreading head 10 which is described in greater detail below. The castoff roller 16 can also be a studded or pin roller of variable rotary speed or a variable speed roller brush. The parabolic path of the particles which advance particle sizes or fractions of the particulate can thus be modified by changing the speed of the roller 16. The roller 16 is horizontally and vertically adjustable so that, for example, it can clear the fine particle zone 21 and only contact the overlying coarser particle zone of the layer advanced in the direction of arrow *7b* by metering conveyer 7.

The particles of the fine-part zone 21 thus cascade onto the initial disks of the interdigitating-disk spreading head 10 and can pass downwardly through the interstices of the disks to form the layer 22. The coarser particles are cast along the spreading head and can form intermediate layers of the mat. The fine particles thus are confined to the facing layer 22 and are not to be found in the intermediate layer 30.

Figure 3:
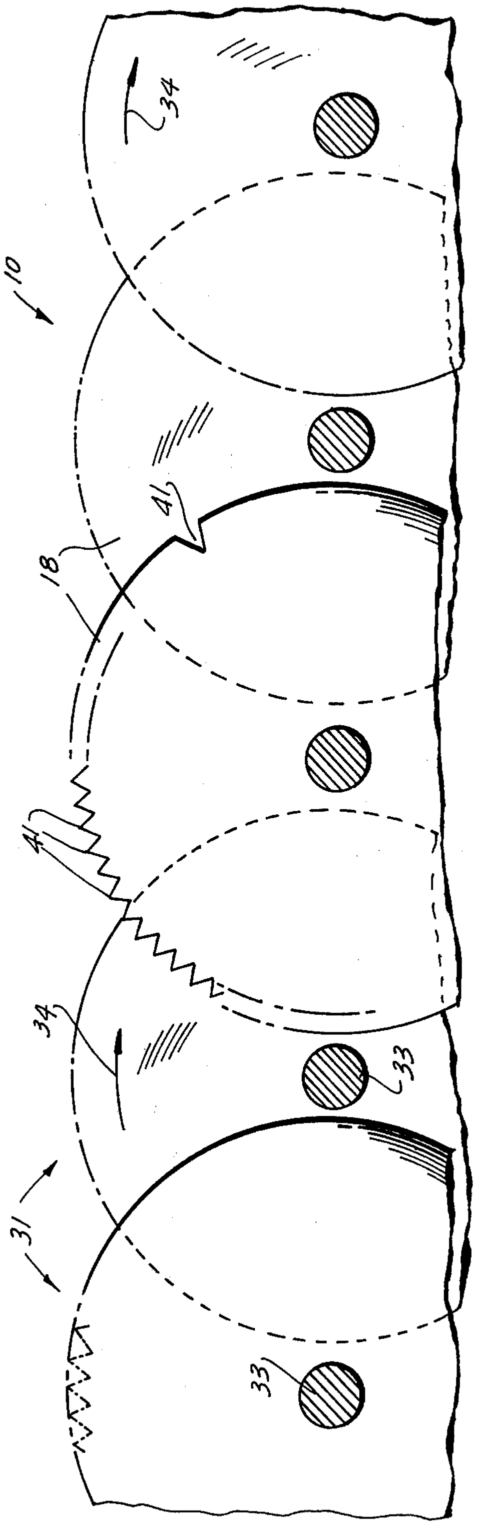
FIG. 3 is a detail view of the region represented at III of FIG. I.
Figure 4:
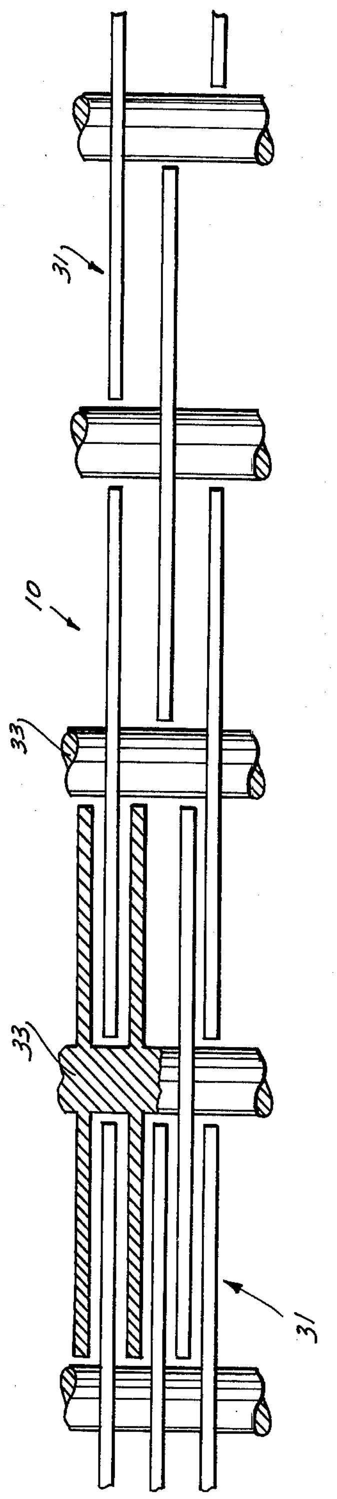
FIG. 4 is a plan view of the spreading head of FIG. 3, partly broken away.

The interdigitating-disk spreading head 10 as can be seen from FIGS. 3 and 4, comprises a plurality of disk rollers 31 formed from the toothed-periphery disks 18 which are transversely staggered so that each disk of one roller is received between the disks of an adjacent roller. The rollers 31 are all driven in the clockwise sense and have spacings which increase to the right when the mat-forming band 11 is displaced in the direction of arrow 32. Thus the head pin acts as a further classifier with fine particles being permitted to pass downwardly to the left hand end and particles of increased size passing downwardly in successive zones 35–37 as the particulate material is carried from the top of one disk roller 31 onto the next. The toothed or star wheel disks 18 also break up any clumps or agglomerate of particles while classifying the latter. The disk rollers 31 can be fitted together (FIGS. 3 and 4) so as to have a drum-like core 31. In FIG. 3 the sense of rotation of the disks is illustrated by the arrow 34.

As noted above and as best seen from FIG. 4, the interstitial spacing progressively increases in the direction of movement of the particulate material from one roller 31 to the next. The change in spacing can be effected by varying the number of disks, using disks of different thickness or in some other manner. The particles thus can pass through the head in the fine particle column 35, the intermediate particle column 36 or the coarse particle column 37. The transition as to particle sizes between the columns can of course, be continuous.

When large chips, splits or pieces of wood are present these can be carried from roller to roller along the head to be ultimately deposited in the channel 38 at the downstream end of the head, the pieces being removed from the channel automatically or after a period of time.

The air classifier or sifter 19 feeds a stream of air between the conveyer 11 and the head 10 so that fine particles are swept in the direction opposite the direction of vanes of the conveyer 11 and are further classified with the finest particles forming the layer closest to the surface 11. The air classifier 19 can have an air inlet in the region of the last roller 31 and an air outlet 40 in the region of the first rollers 31 with reference to the direction of displacement of the mats (arrow 32). Since the air classifier can use a variable-rate fan 39*a* and the speeds of rollers 31 are adjustable, a precise control of the subsequent particle classification can be attained. All of the duct rollers 31 of the embodiment illustrated can be adjusted and, moreover, the inclination of the plane P with respect to the horizon of the head 10 formed by the array of rollers 31 can be adjusted as represented by the arrow 10*a,* e.g. by tilting the array about the axis 10*b*.

From FIG. 3 it will be apparent that the disks 18 and teeth or notches 41 which facilitate entrainment of the particles can also serve to displace air through the air classifier 19 in addition to or in place of the fan 39*a*.

The air classifier 19 can be provided with a separating sieve 42 which may be mounted resiliently at 42*a* and connected via a linkage 43*a* to a crank 43 driven in the direction of arrow 43*b*. The crank drive thus constitutes a shaker or vibrator which practically limits the fine particle layer initially deposited on the surface 11 to rod-like particles which can be entrained with the air stream and pass in the direction of the air stream through the sieve or screen 42. A guide plate 44 can deflect the particles downwardly onto the surface 11. Thus, the particles forming the bottom layer on the surface 11 can be aligned as well as limited to the fines of particles. Whether the layer 22 is deposited on top of the coarse particle zone or underneath the latter depends upon whether the surface 11 is shifted in the direction of arrow 32 or in the opposite direction.

We claim:

1. An apparatus for the preparation of mats of particulate material, especially the formation of particle board by pressing of the mat, comprising:

a hopper for receiving a supply of particulate material, said hopper including
- a dispensing conveyor forming a floor adapted to receive a pile of said material and advancing said pile horizontally in a given direction,
- a roller grate forming a wall of said hopper engageable with said pile upon the displacement thereof in said direction, said roller grate being inclined to the vertical and feeding particles from said pile in a cascade, and
- means for feeding particulate material to said pile on said dispensing conveyor;

classifying means beneath said roller grate for segregating said cascade of particulate material into relatively fine particles and coarser particles;

metering means beneath said classifying means for advancing particles collected therefrom at a given rate, said metering means including
- a metering conveyor disposed below said classifying means and receiving said fine particles in a first layer and said coarser particles in at least one second layer on said first layer, said metering conveyor having a discharge end,
- a volume-metering roller disposed along said metering conveyor for regulating the volume rate of the flow of particles on said metering conveyor past said volume-metering roller,
- means for detecting the weight of particles per unit area on said metering conveyor,
- a weight-metering roller along said metering conveyor controlled by the last mentioned means for maintaining a predetermined weight of particles per unit area on said metering conveyor, and
- a cast-off roller at said discharge end of said metering conveyor for casting particles therefrom;

a spreading head adjacent said discharge end of said metering conveyor for receiving the particles cast by said cast-off roller from said metering conveyor, said spreading comprising an array of interdigitating disk rollers all driven in the same sense and with progressively increasing interdigitating spacing away from said discharge end, the particles on said discharge end being advanced along the top of said array away from said discharge end;

a receiving surface displaceable beneath said spreading head for receiving the fine particles therefrom in a first layer and coarser particles therefrom in at least one further layer overlying said first layer, said surface being displaced in the direction of displacement of said particles on the top of said array; and an air sifter between said head and said surface for additionally separating fine from coarse particles.

2. The apparatus defined in claim 1 wherein:

said air sifter includes a sieve disposed between the end of said head proximal to said metering conveyor and said surface;

said sieve is provided with a vibrator; and the disks of said rollers of said head are provided with formations enabling them to displace air for said air sifter.

3. The apparatus defined in claim 2 wherein said classifying means includes a sieve.

4. An apparatus for the preparation of mats of particulate material, especially the formation of particle board by pressing of the mat, comprising:

a hopper for receiving a supply of particulate material, said hopper including a dispensing conveyor forming a floor adapted to receive a pile of said material and advancing said pile horizontally in a given direction, a roller grate forming a wall of said hopper engageable with said pile upon the displacement thereof in said direction, said roller grate being inclined to the vertical and feeding particles from said pile in a cascade, means for feeding particulate material to said pile on said dispensing conveyor, and a leveling roller for controlling the height of said pile on said conveyor;

classifying means beneath said roller grate for segretating said cascade of particulate material into relatively fine particles and coarser particles;

metering means beneath said classifying means for advancing particles collected therefrom at a given rate, said metering means including a metering conveyor disposed below said classifying means and receiving said fine particles in a first layer and said coarser particles in at least one second layer on said first layer, said metering conveyor having a discharge end, a volume-metering roller disposed along said metering conveyor for regulating the volume rate of the flow of particles on said metering conveyor past said volume-metering roller, means for detecting the weight of particles per unit area on said metering conveyor, a weight-metering roller along said metering conveyor controlled by the last mentioned means for maintaining a predetermined weight of particles per unit area on said metering conveyor, and a cast-off roller at said discharge end of said metering conveyor for casting particles therefrom;

a spreading head adjacent said discharge end of said metering conveyor for receiving the particles cast by said cast-off roller from said metering conveyor, said spreading head comprising an array of interdigitating disk rollers all driven in the same sense and with progressively increasing interdigitating spacing away from said discharge end, the particles on said discharge end being advanced along the top of said array away from said discharge end;

a receiving surface displaceable beneath said spreading head for receiving the fine particles therefrom in a first layer and coarser particles therefrom in at least one further layer overlying said first layer, said surface being displaced in the direction of displacement of said particles on the top of said array; and an air sifter between said head and said surface for additionally separating fine from coarse particles.

5. The apparatus defined in claim 4 wherein:

said air sifter includes a sieve disposed between the end of said head proximal to said metering conveyor and said surface;

said sieve is provided with a vibrator; and the disks of said rollers of said head are provided with formations enabling them to displace air for said air sifter.

6. The apparatus defined in claim 5 wherein said classifying means includes a sieve.

* * * * *